Figure 1:
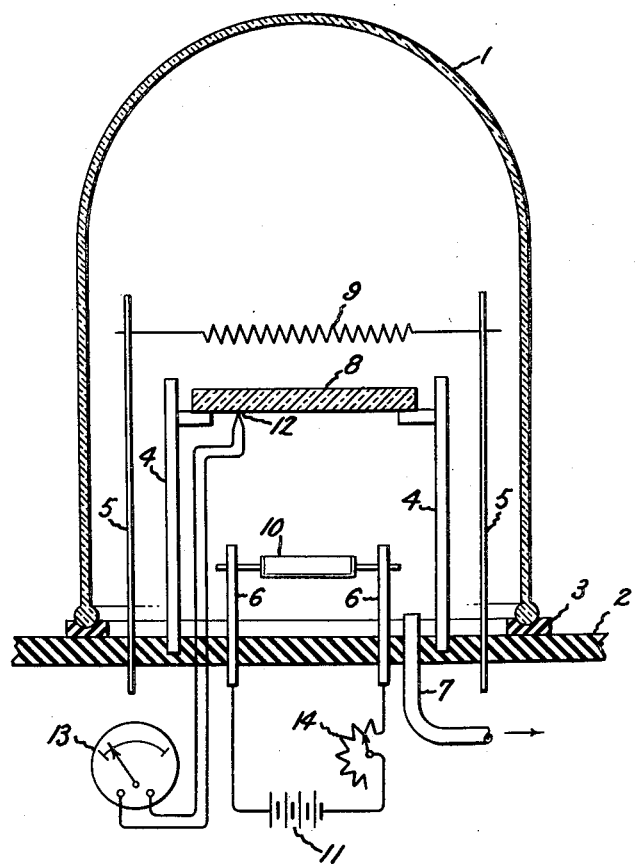

Jan. 3, 1961   H. D. COGHILL ET AL   2,967,111

METHOD OF PREPARING LUMINESCENT SCREENS

Filed Feb. 25, 1957

Inventors:
Henry D. Coghill,
Lewis R. Koller,
by Paul A. Frank
Their Attorney.

United States Patent Office 2,967,111
Patented Jan. 3, 1961

2,967,111
METHOD OF PREPARING LUMINESCENT SCREENS

Henry D. Coghill, Burnt Hills, and Lewis R. Koller, Schenectady, N.Y., assignors to General Electric Company, a corporation of New York Filed Feb. 25, 1957, Ser. No. 641,986

10 Claims. (Cl. 117—33.5)

The present invention relates to methods for preparing luminescent screens by vacuum evaporation.

For reasons of improved contrast, ease of manufacture, and absence of scattering effects, it is desirable that luminescent screens for use in such devices as cathode ray tubes and television picture tubes, be composed of transparent continuous crystalline films. One proposed method for forming such films is by vacuum evaporation.

While many attempts have previously been made to produce such screens by vacuum evaporation, these attempts have been largely unsuccessful since the phosphor films produced thereby either exhibited extremely low luminescent efficiency or are not properly bonded to the faceplate upon which they are deposited and subsequently peel off. Additionally, some types of films so formed burn under cathode ray excitation and hence are of short-lived usefulness. Furthermore, vacuum evaporated luminescent screens often required a further heat-treating step after the deposition thereof to insure proper activation.

Accordingly, an object of the present invention is to provide an improved and simplified method for preparing evaporated luminescent screens.

A further object of the invention is to provide a simplified method for preparing evaporated luminescent screens which method does not require heat-treatment of the screens after the evaporation thereof.

A further object of the invention is to provide a method for preparing evaporated luminescent films which may be conducted at substrate temperatures low enough to permit the use of soft glass as a substrate therefor.

Still another object of the invention is to provide a method of forming improved, high-purity, multi-layer color image presentation screens.

In accord with one aspect of our invention, transparent luminescent screens are prepared by vacuum evaporation of manganese activated zinc-cadmium sulfo-selenide phosphors upon a transparent substrate. The process is conducted at a temperature of the subtrate which is high enough to permit deposition of the phosphor in a crystalline form to insure adherence to the substrate, and yet low enough to allow the process to be conducted utilizing soft, low melting-point glasses. The films as deposited are cathodoluminescent and require no subsequent steps for the activation thereof.

In accord with a further aspect of our invention we evaporate a layer of a manganese activated zinc-cadmium sulfo-selenide phosphor upon another suitable layer of red, blue or green emitting cathodoluminescent phosphor to form an improved, high purity two-color cathode ray tube screen.

Figure 2:
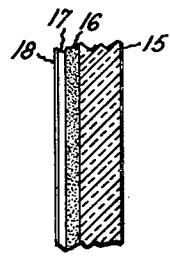

The novel features believed characteristic of the invention are set forth in the appended claims. The invention itself, however, together with further objects and advantages thereof, may best be understood with reference to the following detailed description taken in connection with the accompanying drawings in which:

Figure 1 represents apparatus suitable for evaporating films in accord with the invention, and Figure 2 is a sectional view of a portion of an improved two-color cathode ray tube screen formed in accord with the invention.

Prior attempts to provide transparent luminescent screens by vacuum evaporation methods have not been very successful. This lack of success has been generally due to the fact that films formed by prior art methods either exhibit extremely low luminous efficiency or are not properly bonded to the substrate upon which they are deposited. Additionally, some evaporated phosphors formed by vacuum evaporation burn readily under cathode ray excitation. We have discovered that these and other difficulties of prior art evaporation method may be overcome with a better understanding of the requirements for vacuum evaporation and of the conditions required, due to the nature of the phosphor utilized. Principally, we have discovered that proper control of the temperature of the substrate upon which the film is evaporated is of utmost importance.

Most phosphors, to be luminescent, require that atoms of a principal activator be present in a host phosphor material crystal lattice. Additionally, the presence of a secondary activator or co-activator atom in the immediate vicinity of each atom of the principal activator within the host phosphor crystal lattice is also necessary. The site at which the principal activator and co-activator atoms exist is referred to as a "center of activation." These centers absorb energy when excited by cathode rays and luminescence occurs when absorbed energy is emitted as a photon of visible light. For most luminescent phosphors, the problem of vacuum evaporation is quite complicated. Thus, for example, in order that luminescence may occur the phosphor must be crystalline, it must have dispersed therein a principal activator and a co-activator. In order that the phosphor deposited upon a substrate be usable in a cathode ray tube or like device, the phosphor must be well bonded to the substrate upon which it is formed. We have found that phosphors deposited upon substrates maintained at temperatures below 100° C., while exhibiting good luminescent characteristics upon subsequent heat-treatment and activation, are not well bonded to the substrate. We have further found that most phosphors when deposited on a substrate by vacuum evaporation while the substrate is maintained at a temperature above 100° C. are well bonded because they possess a crystalline structure. These phosphors, however, may not be properly heat treated to subsequently incorporate thereinto a luminescence co-activator, because the co-activator atoms, rather than diffusing into the individual crystals to become associated with principal activator atoms, preferentially diffuse along crystal boundaries and interfaces. Thus, for most phosphors it is an extremely difficult task to properly activate a vacuum evaporated phosphor layer. This difficulty arises mainly from the necessity of having principal activator atoms and co-activator atoms closely associated with one another within the host phosphor crystal lattice.

We have discovered, however, that manganese activated zinc-cadmium sulfo-selenide phosphors possess unique characteristics, which make possible a simple vacuum evaporation technique productive of highly efficient, transparent, luminescent phosphor layers. This is due mainly to the fact that the manganese activator in zinc-cadmium sulfo-selenide phosphors is unique among other principal activators, in that it does not require the presence of a secondary activator or co-activator within the crystal lattice for the creation of centers of activation. Thus, we have found that manganese activated zinc-cadmium sulfo-selenide phosphors may be vacuum evaporated to form a crystalline layer upon a suitable substrate which layer is cathodoluminescent without any further heat-treatment.

In accord with our invention, therefore, we form improved transparent luminescent screens by supporting a transparent substrate within an evacuable chamber and, while the substrate is maintained at a temperature of 225° C. to 350° C., vacuum evaporating thereupon a thin crystalline layer of a manganese activated zinc-cadmium sulfo-selenide phosphor. As deposited, the phosphor layer is luminescent when bombarded by cathode rays.

Figure 1 of the drawing represents a vacuum evaporation apparatus suitable for use in the practice of the invention. In Figure 1, a suitable bell jar 1 is mounted upon an insulating table 2 and sealed thereto with vacuum seal 3. Insulating table 2 has therein suitable openings for the passage therethrough of substrate support members 4, heater support members and connectors 5, evaporation boat support members and conductors 6 and evacuation conduit 7. A suitable substrate 8 which may for example be soft glass, Pyrex glass, Vycor glass, quartz or any other suitable transparent member is mounted upon support members 4 and held thereby in a horizontal position. A substrate heater 9 which may conveniently be an electric resistance heater, is supported upon electrically conducting heater support members 5 in close juxtaposition to substrate 8 so that the substrate may be heated thereby. Evaporation boat 10 is supported immediately under substrate 8 in close proximity thereto, and electrically connected to conducting evaporation boat supports 6. Evaporation boat 10 comprises a suitable high temperature, high resistance material as for example tungsten, molybdenum or like metals. Electrical energy for the evaporation of phosphor samples is supplied to evaporation boat 10 which acts as its own heater, by a suitable source of electrical energy represented by battery 11. A thermocouple 12 is connected in heat conducting relationship with the under surface of substrate 8 to accurately measure the temperature thereof. The temperature of the under surface of substrate 8 is indicated upon a meter 13. The temperature of boat 10 may be maintained at any desired temperature by adjusting rheostat 14.

In practicing the invention, a suitable substrate 8, which may conveniently be soft glass, Pyrex glass, Vycor glass, quartz or any suitable transparent material, is first cleaned with any conventional polishing or cleaning material. After cleaning, the substrate is washed in distilled water, air dried, and mounted in the apparatus. A compressed pellet of the phosphor to be utilized is next placed within evaporation boat 10. The material to be evaporated may conveniently be the phosphor from which the luminescent film is to be formed, namely any of the manganese activated zinc-cadmium sulfo-selenide phosphors. Such phosphors include zinc sulfide, cadmium sulfide, zinc-cadmium sulfide, zinc selenide, cadmium selenide, zinc-cadmium selenide, zinc-cadmium sulfo selenide and mixtures thereof. It is not necessary, however, that the activated phosphor itself be evaporated, although this is most convenient. Alternatively, a luminescent-grade host phosphor material may be vacuum evaporated and the manganese may be supplied either in metallic form or in the form of a suitable vaporizable manganese compound preferably manganese chloride, although manganese fluoride, manganese bromide and manganese iodide are also suitable. The manganese or manganese containing compound may be pressed into the same pellet with the host phosphor, or a luminescent-grade host phosphor material may be evaporated from evaporation boat 10 and manganese or a suitable manganese-containing compound may be evaporated from a separate boat, identical with evaporation boat 10, but supplied with a separate heater supply and separately regulated for accurate temperature control. In all cases manganese should be present in quantities of 0.001 to 0.1 weight percent of the phosphor host material present.

After the material to be evaporated has been placed in evaporation boat 10, bell jar 1 is vacuum sealed to base plate 2 and the temperature of the substrate is raised to a convenient temperature, as for example, from 300° C. to 400° C. to degas substrate 8. At the same time, bell jar 1 is evacuated to a pressure of a few microns of mercury or less and maintained at this pressure during the entire process. Preferably the pressure is maintained at less than 1 micron of mercury. The degassing step may continue for approximately 10 to 30 minutes in order to remove all occluded and adsorbed gases from the substrate.

After degassing, the temperature of substrate 8 is adjusted by properly controlling the current passed through heater 9 to adjust the temperature of substrate 8 to operating temperature, as indicated by thermocouple 12 upon meter 13. For vacuum evaporation of manganese activated zinc-cadmium sulfo-selenide phosphors in accord with the invention, substrate 8 may be maintained at a temperature from 225° C. to 350° C. At temperatures above 350° C. the time required to form a phosphor film of the desired thickness upon the substrate is markedly extended. Likewise, at high temperatures it becomes impossible to utilize low melting-point glasses. The use of low temperature is particularly advantageous in the practice of the present invention, since by the use of these low temperatures it becomes possible to conduct the vacuum evaporation operation directly upon the interior of soft glass cathode ray tube faceplates, already formed.

Once the temperature of substrate 8 has reached the proper value, as indicated by the temperature measuring apparatus, electrical current is supplied through conductors 6 to evaporation boat 10 to raise the temperature thereof to the temperature of approximately 1185° C. to 2000° C. Below 1185° C. the evaporation of zinc-cadmium sulfo-selenide phosphors does not proceed at an appreciable rate. Above 2000° C. the evaporation proceeds at too rapid a rate and particles rather than vapor may be ejected. We have found that optimum evaporation rates are obtained when the temperature of the evaporation boat 10 is maintained at approximately 1500° C. This temperature may conveniently be observed with an optical pyrometer.

Evaporation under the aforementioned conditions is carried out for whatever time is desired in order to cause the formation of a desired thickness of phosphor upon substrate 8. With substrate 8 maintained at a temperature of approximately 250° C. and evaporation boat 10 maintained at a temperature of approximately 1500° C. we have found that phosphor deposits upon the under surface of substrate 8 at a rate of approximately 0.2 micron per minute.

The evaporated film so formed may be formed in any desired thickness from approximately 0.25 to 100 microns in thickness. The thickness of the evaporated films depends upon the application in which the film is to be utilized. Thus, for example, if the film is to be utilized under the excitation of 10 kilovolt electrons, it is convenient that the film have a thickness of approximately 2.4 microns. If, on the other hand, the film is to be excited by incident X-rays it is convenient that the film have a thickness the order of 100 microns.

After evaporation has continued for a desired time or, alternatively, all of the phosphor and activator within evaporation boat 10 are exhausted, current through substrate heater 9 and evaporation boat 10, is discontinued and the apparatus is allowed to cool to room temperature. The bell jar is then opened and substrate 8 is removed and may be incorporated directly into a cathode ray tube or television tube as the faceplate thereof. Under excitation of cathode rays, zinc-cadmium sulfo-selenide films activated with manganese in accord with the invention emit a characteristic yellow luminescence which luminescence need not be induced by any further heat-treatment after the film has been formed as is described hereinbefore.

In accord with the further feature of our invention, the vacuum evaporation technique, described hereinbefore, may be utilized for the production of improved penetron-type color cathode ray screens suitable for use in television, color radar, and like applications.

The characteristics and mode of operation of the penetron-type color presentation screen are described in detail in Patent No. 2,590,018 to L. R. Koller et al. Briefly, the penetron screen comprises a plurality of overlaid layers of different-color emitting luminescent phosphors deposited upon a suitable substrate. Penetron screens may be constructed to operate in two color or three color systems. Briefly, the operation of the penetron screen is as follows: A composite beam of electrons, derived from a plurality of separate electron guns or a composite electron gun capable of emitting a plurality of beams of electrons having different energies, is directed upon a composite screen such as illustrated in Figure 2 of the drawing.

In Figure 2 a two color penetron screen comprises a transparent faceplate 15 upon which there is deposited a first phosphor layer 16 and a second phosphor layer 17. For convenience phosphor layer 17 may be overlaid with a thin layer 18 of a conducting metal such as aluminum, as is conventional in television cathode ray tubes. As is well known to the art, when an electron is incident upon a layer of a luminescent phosphor it penetrates into the phosphor layer a predetermined depth at which its progress is substantially halted. When the progress of the electron is halted the greatest portion of the energy it possesses is transmitted to the luminescent phosphor at that position, causing the emission of visible light. The characteristic color emitted by virtue of the impingement of an electron upon a phosphor layer is thus dependent upon the phosphor composition at the point where the electron comes to rest. Thus, in the screen illustrated in Figure 2 of the drawing, the emission excited by a particular incident electron may be regulated by regulating the depth of the penetration of the electron. If the electron penetrates only into layer 17 it causes the emission of light characteristic of layer 17. If it passes through layer 17 and into layer 16 it causes the emission of light characteristic of layer 16.

While the penetron principal has been known for some time, it has heretofore been difficult to prepare high-quality penetron screens suitable for color television and similar uses. If a penetron screen is composed of three different layers of particulate grainy phosphors such as those conventionally used in present monochrome television picture tube screens, it is not possible to obtain high color purity images therefrom utiilzing safe voltages. This is due to the grainy nature of the phosphors utilized. Although the phosphor layer farthest removed from the source of electrons is suitable for use in penetron screens, the particulate grainy phosphors are not suitable for use as intermediate layers more closely disposed to an electron beam. If a grainy screen is used for one of the intermediate layers the thickness required for the attainment of proper color purity makes it necessary that the incident electrons be propelled at such high energies that dangerous and unworkably high accelerating potentials must be utilized. Thus for example, a typical 2 component penetron screen utilizing particulate layers sufficiently thick to insure reasonable color purity generally utilizes 2 layers each 10 milligrams per square centimeter and requires a total operating potential of 60 kilovolts. If on the other hand, the intermediate phosphor layers are decreased in thickness to avoid the necessity of using high voltages, the grainy nature of the screen which causes the inclusion of many air pockets and interstices between the phosphor particles, results in an inhomogeneous layer which offers different impedances to different electron paths. Thus, electrons having the same energies striking such a thin layer at different points of incidence penetrate to different depths. As a result of this, some electrons having an energy calculated to cause the excitation of a first phosphor layer will, if a grainy phosphor layer is used and this layer is thin enough to avoid the use of unnecessary and dangerously high voltages, penetrate the layer intended to be excited and excite the next layer. This results in decreased color purity to such an extent that such type penetron screens have not heretofore been competitive with other type color image presentation screens.

It has been proposed that thin transparent crystalline films be utiilzed as a substitute for grainy particulate screens in a penetron screen. While screens produced in accord with this proposal show improved characteristics over the grainy particulate penetron-type screens they are not completely satisfactory. Present vacuum evaporation techniques require utilization of high temperatures of the order of 600° C. for the formation of transparent luminescence screens. When a plurality of these transparent layers are deposited one upon another to form a penetron-type screen, the high temperature utilized in causing the deposition of the second and third phosphor layers causes interdiffusion of the activators from one layer to another. Thus impurity activators intended only for the first layer diffuse into the second layer. Impurity activators intended only for the second layer diffuse into the first and the third layers, and impurity activators intended only for the third layer diffuse into the second layer. This interdiffusion of impurity activators results in decreased color purity.

In accord with this feature of our invention, therefore, we provide a method of forming improved penetron-type color image presentation screens which, briefly stated, comprises forming upon a transparent substrate a first layer of a luminescent phosphor, which emits a characteristic red, blue or green color. This first phosphor layer may be formed by any of the methods known to the art, as for instance liquid settling, spraying, vapor deposition, or any of the known vacuum evaporation techniques for the formation of luminescent screens. This layer may be composed of any conventional phosphor which, under cathode ray excitation, emits a characteristic blue, green or red emission spectrum, all of which spectra are suitable for combination with the yellow emission of the manganese activated layers, described hereinbefore, for the production of two-component color images. Upon the already formed phosphor layer we then form a second luminescent phosphor layer of a manganese activated zinc-cadmium sulfoselenide phosphor as is described hereinbefore. Since the second deposited phosphor layer is thin, varying in this embodiment from 0.25 to 10 microns in thickness, high voltages are not necessary to cause electrons to penetrate therethrough to excite the first phosphor layer. Tube screens constructed in accord with this feature of the invention may be operated at working voltages no higher than 25 kilovolts. Since the last deposited phosphor layer is deposited at a temperature of from 225° C. to 350° C., no interdiffusion of luminescent activators between the first and second layers occurs, and hence, the resultant screen exhibits high color purity.

In Figure 2 phosphor layer 16, the layer which may emit red, blue or green emission, as desired, may be prepared in accord with any known phosphor deposition technique. Thus, for example, layer 16 may be prepared in accord with the vapor deposition technique described and claimed in U.S. Patent No. 2,685,530 to D. A. Cusano et al. When prepared by this technique layer 16 may comprise zinc sulfide, zinc selenide, zinc sulfoselenide, zinc-cadmium (0 to 35% cadmium) sulfide or zinc-cadmium (0 to 35% cadmium) selenide or mixtures thereof activated with 0.001 to 0.5 weight percent of silver for blue emission; or zinc sulfide, zinc selenide, zinc sulfoselenide, zinc-cadmium (0 to 4% cadmium) sulfide or zinc-cadmium (0 to 4% cadmium) selenide or mixtures thereof activated with 0.005 to 0.2 weight percent of copper for blue or green emission; or zinc-cadmium (65 to 90% cadmium) activated with 0.001 to 0.5 weight percent of silver or zinc-cadmium (25 to 35% cadmium) sulfide activated with 0.005 to 0.2 weight percent of copper for red emission or any other suitable phosphor material which results in a red, green or blue emission suitable for combination with the characteristic yellow emission of manganese activated zinc-cadmium sulfoselenide phosphors for the production of a pleasing two-component color image.

In accord with the vapor reaction technique, a mixed charge comprising a material containing the phosphor cation, as for example zinc, cadmium, or mixtures thereof or volatilizable salts thereof or a mixture of these elements and salts thereof together with a suitable luminescence activator are continuously fed into a heated crucible within a gas reaction chamber whereby vapors of zinc, cadmium or mixtures thereof together with vapors of the activator rise and mix with a reducing gas containing the phosphor anion, as for example hydrogen sulfide, hydrogen selenide or a mixed hydrogen sulfide and hydrogen selenide gas in the vicinity of a heated substrate which is maintained at a temperature of from 550° C. to 750° C. In the vicinity of the heated substrate the gas and the vapors react to chemically deposit upon the surface of the substrate an activated phosphor of the zinc-cadmium sulfo-selenide family. The reaction is carried out for a time sufficiently long to deposit upon the substrate a sufficiently thick layer in whatever thickness it is desired, from approximately 1 to 50 microns. The film as formed is transparent, continuous, homogeneous and is luminescent when excited by cathode rays.

Alternatively, layer 16 may comprise any conventional grainy particulate phosphor prepared by conventional spraying or liquid settling techniques well known to the art, which phosphor emits a suitable color which, in combination with the characteristic yellow emission of manganese activated zinc-cadmium sulfoselenide phosphors produces a pleasing two component color presentation. Such phosphors include zinc sulfide, zinc selenide, zinc sulfoselenide, zinc-cadmium (0 to 35% cadmium) sulfide, zinc-cadmium (0 to 35% cadmium) selenide and mixtures thereof activated with 0.001 to 0.5 weight percent of silver and self activated zinc oxide for blue emission; or zinc sulfide, zinc selenide, zinc sulfoselenide, zinc-cadmium (0 to 4% cadmium) sulfide, zinc-cadmium (0 to 4% cadmium) selenide and mixtures thereof activated with 0.005 to 0.2 weight percent of copper, self-activated zinc oxide and zinc silicate activated with 0.01 to 2 weight percent of manganese for blue-green emission; or zinc-cadmium (65 to 90% cadmium) sulfide activated with 0.001 to 0.5 weight percent of silver, zinc-cadmium (25 to 35% cadmium) sulfide activated with 0.005 to 0.2 weight percent of copper and zinc-phosphate activated with 0.01 to 1% of manganese for red emission; or any other suitable phosphor material which results in a red, green or blue emission suitable for combination with the characteristic yellow emission of manganese activated zinc-cadmium sulfoselenide phosphors for the production of a pleasing two-component color image.

In accord with the liquid settling technique the substrate to be covered with the grainy phosphor layer is placed in the bottom of a suitable container having approximately the same diameter as the diameter of the substrate. A cushioning solution which may comprise approximately 10% of potassium silicate in a de-ionized water solution is poured over the baseplate, and into the cushioning solution is poured a water suspension of the powdered phosphor from which the film is to be formed. The suspension and the cushioning solution are then allowed to sit for a period of time generally of the order of 1 or 2 hours, during which time the phosphor particles settle by gravity through the cushioning solution onto the substrate. After one or two hours of settling, the liquid in the container is then siphoned off and the plate is removed and allowed to air dry. When dry, the phosphor particles are found to be formed in an adherent layer on the surface of the substrate.

Irrespective of its method of formation, phosphor layer 16 should be one which emits visible light within the spectral range from .420 to .530 micron wavelength and exhibits blue or green luminescence or from .640 to .760 micron and exhibits red luminescence under cathode ray excitation. Thus, any visible light emitting phosphor which emits light other than from .530 to .640 micron is suitable.

Layer 17 comprises a manganese activated zinc-cadmium sulfoselenide phosphor deposited as is described hereinbefore at medium temperature to prevent the interdiffusion of activators between layers 16 and 17.

Because layer 17 is thin, from 0.25 to 10 microns, it presents little impedance to high voltage electrons and does not require a penetron cathode ray tube including the screen in Figure 2 to utilize excessively high voltages. Because the film is deposited at temperatures of from 225° C. to 350° C., no interdiffusion between layers 16 and 17 occurs, and high purity color images are attained thereby.

The following examples illustrative of the practice of our invention are given by way of example only and are not to be construed in a limiting sense.

*Example 1.*—A 2" diameter disc of Pyrex ⅛" thick is polished on one surface thereof with "Precisionite" ($Al_2O_3$) abrasive compound, washed in distilled water and air dried. This glass substrate is placed in the apparatus of Figure 1 six inches above a tungsten evaporation boat 10. A 1.5 gram compressed pellet containing a manganese activated zinc sulfide phosphor (0.1% by weight of manganese) is inserted in evaporation boat 10. Bell jar is vacuum sealed to the table top and evacuated to a pressure of less than $10^{-4}$ millimeters of mercury. Electrical current is supplied to resistance heater 9 raising the temperature of substrate 8 to 300° C. for 20 minutes. The temperature of evaporation boat 10 is then raised to 1400° C. and maintained at this temperature for 8 minutes after which time the pellet in evaporation boat 10 evaporated and a transparent luminescent film of approximately 1.5 microns thickness was deposited on the under surface of substrate 8. Substrate 8 was then removed and incorporated as a faceplate of a demountable cathode ray tube. Under the excitation of 5 kilovolt electrons the screen emitted a bright yellow luminescence.

*Example 2.*—Example 2 was conducted following the same steps as in Example 1 except that the pellet placed in evaporation boat 10 contained 1.5 grams of zinc-cadmium sulfide (20% cadmium) activated with 0.05 weight percent of manganese. After the process had been completed the substrate was removed and tested as in Example 1 and exhibited bright yellow luminescense.

*Example 3.*—The apparatus of Figure 1 was utilized with the exception that two separate evaporation boats were utilized. Into the first boat a compressed pellet of 1.5 grams of luminescent-grade zinc sulfide material was placed. A 4.4 milligram charge of metallic manganese was placed in the second evaporation boat. Both boats were raised to a temperature of 1400° C. and maintained at this temperature for 9 minutes concurrently. After evaporation the substrate was removed and tested as in Example 1, exhibiting bright yellow luminescence.

*Example 4.*—The steps of Example 3 and the modified apparatus thereof were utilized. Into the first boat was placed a 1.5 gram compressed pellet of luminescent-grade zinc sulfide. Into the second boat was placed a 40 milligram charge of manganese chloride. After degassing at a temperature of 300° C. for 20 minutes the first boat was raised in temperature to 1400° C. and the second boat was raised in temperature to 800° C. The boats were maintained at these temperatures for 10 minutes concurrently, after which time the apparatus was cooled, disassembled and the substrate tested as in Example 1 exhibiting yellow luminescence.

*Example 5.*—A 2" diameter ⅛" thick Pyrex glass disc was polished on one surface thereof with "Precisionite" abrasive compound, washed in distilled water and air dried. This disc was placed in a 2" diameter cylindrical vessel and a cushioning solution comprising 70 cubic centimeters of potassium silicate marketed as "Kasil Brand—No. 1" by the Philadelphia Quartz Co., and 700 cubic centimeters of de-ionized water was poured over the glass substrate. A solution of 565 milligrams of standard television phosphor consisting of zinc sulfide activated with 0.01 weight percent of silver suspended in 100 cubic centimeters of de-ionized water was poured into the vessel. The suspension was allowed to settle for 1¼ hours after the liquid was siphoned off. The substrate was removed and air dried until set. The substrate was then removed and placed in a vacuum evaporation apparatus as illustrated in Figure 1 and the vacuum evaporation process was conducted as in Example 1 resulting in a 1.5 micron thick layer of manganese activated zinc sulfide being deposited thereupon. After the vacuum evaporation step the substrate was removed and incorporated into a demountable cathode ray tube as the faceplate thereof. Under excitation by 15 kilovolt electrons the screen emitted bright yellow luminescence having a wavelength of approximately 0.580 micron. Under 22½ kilovolt electron irradiation the screen exhibited blue luminescence having a wavelength of approximately 0.450 micron.

*Example 6.*—A 2" diameter, ⅛" thick Pyrex glass plate was suspended in a reaction chamber directly over an evaporation crucible which is gravity fed by a conduit into which powdered phosphor material could be poured. A second gas inlet conduit entering into the reaction chamber terminated adjacent the underside of the glass plate. The temperature of the glass plate was raised to approximately 550° C. and the evaporation crucible was raised to a temperature of approximately 600° C. The chamber was evacuated, and a flow of hydrogen sulfide at approximately 350 microns of pressure was caused to flow into the chamber and into the area directly under the glass plate. Fifteen grams of a mixture, 1% of which is silver chloride, 10% of which is zinc chloride, the remainder being metallic zinc powder was continuously fed into the evaporation crucible by means of the feed conduit. Over a period of approximately 10 minutes the reaction is carried out. The zinc, zinc chloride and silver chloride were vaporized in the evaporation crucible and the vapor thereof rose to the underside of the glass plate at which point they mingled with the hydrogen sulfide gas resulting in the chemical deposition of a silver and chlorine activated zinc sulfide film upon the glass plate. This film was transparent and luminesced blue under cathode ray excitation. The glass plate was removed from the reaction chamber and placed in the evaporation apparatus illustrated in Figure 1. A manganese activated zinc sulfide film was then formed upon the vapor deposited silver activated zinc sulfide film by the processes described in Example 1. After the formation of this second film, the substrate was removed and mounted as the faceplate of a demountable cathode ray tube. Under 15 kilovolt electron excitation the screen luminesced bright yellow. Under 22½ kilovolt electron excitation the screen luminesced a deep blue.

While the invention has been described with respect to particular examples in the foregoing disclosure many modifications and changes will immediately occur to those skilled in the art without departing from the invention. Accordingly, we intend by the appended claims to cover all such modifications and changes as fall within the true spirit and scope of the foregoing disclosure.

What we claim as new and desire to secure by Letters Patent of the United States is:

1. The method of preparing luminescent screens which method comprises vacuum evaporating a transparent layer of manganese activated phosphor comprising a metal selected from the group consisting of zinc, cadmium, and mixtures thereof, and a non-metal selected from the group consisting of sulphur, selenium, and mixtures thereof upon a transparent substrate while the substrate is maintained at a temperature of 225° C. to 360° C.

2. The method of preparing luminescent screens which method comprises volatilizing a luminescent phosphor comprising a metal selected from the group consisting of zinc, cadmium, and mixtures thereof, a non-metal selected from the group consisting of sulphur, selenium, and mixtures thereof, and 0.001 to 0.1 percent by weight of manganese in an evacuated enclosure in close proximity to a transparent substrate maintained at a temperature of 225° C. to 350° C. to cause the condensation upon the substrate of a transparent luminescent layer of manganese activated phosphor material.

3. The method of preparing luminescent screens which method comprises volatilizing a host phosphor material comprising a metal selected from the group consisting of zinc, cadmium, and mixtures thereof, and a non-metal selected from the group consisting of sulphur, selenium, and mixtures thereof together with a volatilizable manganese containing substance in an evacuable enclosure in close proximity to a transparent substrate maintained at a temperature of 225° C. to 350° C. to cause the condensation upon the substrate of a transparent luminescent layer of manganese activated phosphor material.

4. The method of preparing luminescent screens which method comprises volatilizing a phosphor host material comprising a metal selected from the group consisting of zinc, cadmium, and mixtures thereof, and a non-metal selected from the group consisting of sulphur, selenium, and mixtures thereof in an evacuated enclosure in close proximity to a heated transparent substrate maintained at a temperature of 225° C. to 350° C.; simultaneously volatilizing in the same enclosure a material selected from the group consisting of elemental manganese and the manganese halides to cause the condensation upon the substrate of a transparent luminescent layer of manganese activated phosphor material.

5. The method of preparing a color image presentation screen which method comprises; depositing upon a transparent substrate a first layer of a luminescent phosphor which emits visible light in the visible spectrum other than the range from 0.530 micron to 0.640 micron wavelength; suspending the substrate having thereupon the first film in an evacuable enclosure; and vacuum evaporating a transparent layer of a manganese activated luminescent phosphor comprising a metal selected from the group consisting of zinc, cadmium, and mixtures thereof, and a non-metal selected from the group consisting of sulphur, selenium and mixtures thereof upon the first phosphor layer while the substrate is maintained at a temperature of 225° C. to 350° C.

6. The method of preparing a color image presentation screen which method comprises; depositing upon a transparent substrate a first layer of a luminescent phosphor which emits visible light other than in the spectral range from 0.530 micron to 0.640 micron wavelength; suspending the substrate having thereupon the first film in the evacuable enclosure; and vacuum evaporating a transparent layer of a luminescent phosphor comprising a metal selected from the group consisting of zinc, cadmium, and mixtures thereof, a non-metal selected from the group consisting of sulphur, selenium and mixtures thereof, and 0.001 to 0.1 percent by weight of manganese upon the first phosphor layer while the substrate is maintained at a temperature of 225° C. to 350° C.

7. The method of preparing a color image presentation screen which method comprises; depositing upon a transparent substrate a first layer of a luminescent phosphor which emits visible light other than in the spectral range from 0.530 to 0.640 micron wavelength; suspending the substrate having thereupon the first film in an evacuable enclosure; volatilizing within the enclosure a host phosphor material comprising a material selected from the group consisting of zinc, cadmium and mixtures thereof and a non-metal selected from the group consisting of sulphur, selenium and mixtures thereof, together with a volatilizable manganese containing material in close proximity to the substrate while the substrate is maintained at a temperature of 225° C. to 350° C. to form upon the first phosphor layer a second layer of manganese activated phosphor material.

8. The method of preparing a color image presentation screen which method comprises; depositing upon a transparent substrate a first layer of a luminescent phosphor which emits visible light other than in the spectral range from 0.530 to 0.640 micron wavelength; volatilizing a phosphor host material comprising a metal selected from the group consisting of zinc, cadmium and mixtures thereof, and a non-metal selected from the group consisting of sulphur, selenium and mixtures thereof in an evacuated enclosure in close proximity to a heated transparent substrate maintained at a temperature of 225° C. to 350° C.; simultaneously volatilizing in the same enclosure a material selected from the group consisting of elemental manganese and the manganese halides to cause the condensation upon the first phosphor layer of a second transparent luminescent layer of manganese activated phosphor material.

9. The method of preparing a color image presentation screen which method comprises; depositing upon a transparent substrate a first layer of a luminescent phosphor which emits visible light other than in spectral range from 0.530 to 0.540 micron wavelength by placing the substrate in a suitable container and allowing particles of the selected phosphor material to gravity settle through a suitable cushioning solution onto the substrate, siphoning off the liquid from above the substrate and air drying the settled phosphor layer; suspending the substrate having thereupon the first film in an evacuable enclosure; and vacuum evaporating a transparent layer of manganese activated phosphor comprising a metal selected from the group consisting of zinc, cadmium and mixtures thereof, and a non-metal selected from the group consisting of sulphur, selenium and mixtures thereof upon the first phosphor layer while the substrate is maintained at a temperature of 225° C. to 350° C.

10. The method of preparing a color image presentation screen which method comprises; depositing upon a transparent substrate a first layer of a luminescent phosphor which emits visible light other than in the spectral range from 0.530 micron to 0.640 micron wavelength by suspending the substrate in an evacuable enclosure, heating the substrate to a temperature of from 550° C. to 750° C., volatilizing within the enclosure a quantity of the selected phosphor cation and a suitable luminescent activator therefor, introducing into the enclosure a reducing gas containing the phosphor anion whereby the reducing gas and the phosphor anion react to chemically deposit upon the surface of the substrate a first transparent continuous luminescent film; placing the substrate having thereon the first film in a second evacuable enclosure and vacuum evaporating a transparent layer of manganese activated phosphor comprising a material selected from the group consisting of zinc, cadmium and mixtures thereof, and a non-metal selected from the group consisting of sulphur, selenium and mixtures thereof upon the first deposited phosphor layer while the substrate is maintained at a temperature of 225° C. to 350° C.

References Cited in the file of this patent

UNITED STATES PATENTS

| | | |
|---|---|---|
| 2,398,382 | Lyon | Apr. 16, 1946 |
| 2,600,579 | Ruedy et al. | June 17, 1952 |
| 2,685,530 | Cusano et al. | Aug. 3, 1954 |
| 2,698,915 | Piper | Jan. 4, 1955 |
| 2,732,312 | Young | Jan. 24, 1956 |
| 2,733,163 | Steadman | Jan. 31, 1956 |
| 2,757,304 | Leverenz | July 31, 1956 |